United States Patent
Dannamaneni et al.

(10) Patent No.: US 10,117,073 B1
(45) Date of Patent: Oct. 30, 2018

(54) NETWORK SOLUTIONS FOR BUILDING AND LEVERAGING CLUSTERS OF USER EQUIPMENT ASSOCIATED WITH A TELECOMMUNICATIONS SERVICE PROVIDER

(71) Applicant: Sprint Communications Company L.P., Overland Park, KS (US)

(72) Inventors: Yashwanth R. Dannamaneni, Overland Park, KS (US); Matthew Habiger, Kansas City, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 261 days.

(21) Appl. No.: 15/177,340

(22) Filed: Jun. 8, 2016

(51) Int. Cl.
| | |
|---|---|
| *H04W 4/02* | (2018.01) |
| *H04W 4/21* | (2018.01) |
| *H04W 4/20* | (2018.01) |
| *H04W 4/08* | (2009.01) |
| *G06F 8/20* | (2018.01) |
| *H04W 4/029* | (2018.01) |
| *H04W 88/02* | (2009.01) |
| *G06F 17/30* | (2006.01) |

(52) U.S. Cl.
CPC .............. *H04W 4/21* (2018.02); *G06F 8/20* (2013.01); *H04W 4/023* (2013.01); *H04W 4/028* (2013.01); *H04W 4/029* (2018.02); *H04W 4/08* (2013.01); *H04W 4/206* (2013.01); *G06F 17/30241* (2013.01); *H04W 88/02* (2013.01)

(58) Field of Classification Search
CPC ....... H04W 4/21; H04W 4/029; H04W 4/023; H04W 4/028; H04W 4/08; H04W 4/206; H04W 88/02; G06F 8/20; G06F 17/30241
See application file for complete search history.

(56) References Cited

U.S. PATENT DOCUMENTS

| | | | |
|---|---|---|---|
| 2010/0036912 A1* | 2/2010 | Rao | H04L 51/20 709/204 |
| 2015/0006279 A1* | 1/2015 | Khann | G06Q 30/0246 705/14.45 |
| 2015/0254276 A1* | 9/2015 | Oliver | G06F 17/30241 707/741 |
| 2017/0134232 A1* | 5/2017 | Palanciuc | H04L 41/0893 |
| 2017/0308918 A1* | 10/2017 | Weiss | G06Q 30/0211 |

* cited by examiner

*Primary Examiner* — Luat Phung (57) ABSTRACT

Systems and methods for analyzing data associated with and sent by a plurality of user equipment to a telecommunications service provider by forming clusters of UEs based on a plurality of factors such as geo-location of the UEs, duration in the geo-location, and geohash functions, and analyzing the formed clusters to determine a profile based on attributes of the UE members of the cluster.

20 Claims, 6 Drawing Sheets

NETWORK SOLUTIONS FOR BUILDING AND LEVERAGING CLUSTERS OF USER EQUIPMENT ASSOCIATED WITH A TELECOMMUNICATIONS SERVICE PROVIDER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A variety of electronic devices that are configured to support voice and data communication services are also configured to send performance and usage data to at least one entity such as the telecommunications service provider that supports the device. This data may be continuously received and analyzed for service, maintenance, marketing, and other purposes by the telecommunications service provider or other parties. Because this data is received on a continual basis, the processing and re-processing of the data may be expensive and time consuming, which may result in the delay of actions taken in response to data receipt and analysis.

SUMMARY

In an embodiment, a system for determining clusters of telecommunications service provider subscribers, comprising: a plurality of enhanced node B (eNB) stations; a server associated with a content provider; a server comprising an application stored in a non-transitory memory and executable by a processor; and a data store in communication with the server and configured to receive pluralities of data at periodic intervals from a plurality of user equipments (UEs), wherein each UE of the plurality of UEs is in communication with at least one enhanced node B of the plurality of eNBs and the pluralities of data are associated with the plurality of UEs performance and activity. In an embodiment of the system, the application, when executed by the processor: analyzes a first plurality of data from the data store based upon a UE location and a timestamp, wherein the timestamp is associated with a duration of time in the UE location; forms, in response to the analysis, a plurality of clusters, wherein a first portion of the UEs of the plurality of UEs are members of a first formed cluster based on a determination that the first portion was associated with a first UE location and a first duration of time in the first UE location, and wherein a second portion of UEs of the plurality of UEs are members of a second formed cluster based on a determination that the second portion of UEs of the plurality of UEs was associated with a second UE location for a second duration of time in the second UE location; and determines, subsequent to the parsing, a plurality of attributes of the members of the first formed cluster. In an embodiment, the system further generates and stores a profile for the first formed cluster in the data store based on the determined plurality of attributes; receives a request from the content provider server to transmit content to UEs of the plurality of UEs associated with a set of attributes; analyzes, in response to receiving the request, at least some of the plurality of clusters based on a profile associated with each cluster; determines a subset of clusters of the plurality of clusters associated with the set of attributes in the request; and transmits the content to the UEs associated with the subset of clusters.

In an embodiment, a system for determining clusters of telecommunications service provider subscribers, comprising: a server comprising an application stored in a non-transitory memory and executable by a processor; a data store in communication with the server and configured to receive data at periodic intervals from a plurality of user equipments (UEs), wherein each UE of the plurality of UEs is in communication with at least one enhanced node B (eNB) of a plurality of base transceiver stations, wherein the data is associated with at least a UE location, a predetermined error associated with the UE location, and a duration of time associated with a UE's presence in the location; wherein the application, when executed by the processor: analyzes a first plurality of data from the data store based upon a UE location associated with the first plurality of data, a duration of time associated with the UE location, and a predetermined error associated with the UE location. The embodiment further comprising wherein the application forms, in response to the analysis of the first plurality of data, a first plurality of clusters, wherein some of the UEs are members of a first cluster of the first plurality of clusters formed based on the at least some UEs association with a first location for a first duration of time and a first predetermined error associated with the first location, and wherein some UEs of the plurality of UEs are members of a second cluster of the first plurality of clusters formed based on the at least some UEs association with a second location for a second duration of time and a second error associated with the second location.

In an embodiment, a method for determining clusters of telecommunications service provider subscribers, comprising: performing, by an application stored in a non-transitory memory of a server, a first analysis on a plurality of data, based upon at least two of a determined first UE location, a duration in the first UE location, a second UE location, a duration in the second UE location, an error associated with the determination of the first UE location, an error associated with a second UE location, and a first geohash function, wherein the first geohash function generates a first string, wherein the plurality of data is associated with a plurality of user equipments (UEs); and forming, by the application, based on the analysis, a first plurality of clusters, wherein each UE of the plurality of UEs are members of at least one cluster of the first plurality of clusters. The embodiment further comprising performing, by the application, a second analysis at least some of the plurality of data by applying at least one of a different error associated with the first UE location, a different error associated with the second UE location, and a second geohash function, in response to a determination that at least some of the first plurality of clusters are associated with a number of UEs below a predetermined threshold; forming, by the application, based on the second analysis, a second plurality of clusters, wherein each cluster of the second plurality of clusters is associated with a number of member UEs above the predetermined threshold.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Telecommunications service providers and other companies may receive large amounts of data on the order of terabytes on a daily or more frequent basis. This data may be extracted and analyzed in order to, for example, improve maintenance and resulting service, adjust communication service plan offerings and pricing, sell and distribute advertisements, and support other initiatives that improve service, drive quality, route and distribute secondary content, and increase profits. As used herein, "secondary content" shall mean content that may not be explicitly requested by a user or user device, but that may be informative, useful, and appreciated by a targeted user or user group. For example, an unsolicited notification regarding the discovery of a comet may be sent to an amateur astronomer, or a notification about the death of a famous musician may be sent to a music enthusiast. Secondary content comprises unsolicited, non-commercial, unsubscribed content that is ancillary to ongoing primary data communication activity such as browsing, gaming, or the use of social media applications.

In an embodiment, a telecommunications service provider receives information from a plurality of types of user equipments (UEs) supported by various brands across the provider's network. This information may be received and sorted by the location, e.g., longitude and latitude, proximity to one or more towers, etc., in order to determine the location and density of subscribers. The processing, re-processing, and analysis of this data may be expensive and time-consuming. The information (data) received from the plurality of UEs comprises data about the UE, such as UE locations, time spent in various radiuses/distances from a location (e.g., the location used as a factor to form a cluster), average or range of distances traveled between similar locations during similar times (live/work in similar areas), time spent outside a geographic location or locations (work/recreational travel), gender, age, length of subscription service, number of UEs associated with a user account, and other attributes. Some of this data may associated with business and personal user accounts for service with the telecommunications service provider. In some embodiments, the data received may also be associated with UE performance, such as dropped calls, calls to customer care, failed attempts to connect to towers, etc.

The systems and methods discussed herein take the data received from the plurality of user equipments and store the data for further analysis based not only on the location of the UEs reporting data to the telecommunications service provider, but also based on a time or range of time associated with a UE's presence in a location, an error of the location determination, and/or a geo-hashing function. The UEs are assigned to one or more clusters based on the location and one or more of the additional factors. In an embodiment, a single UE may be assigned to one or more clusters, and the clusters may be further analyzed and parsed into sub-clusters or otherwise analyzed to determine attributes of the clusters to form and store profiles for each cluster or sub-cluster. These clusters may be analyzed and updated for service, maintenance, and marketing purposes, which reduces the load on the server or servers performing the analysis. As used herein, a "factor" is an aspect of UE data that is applied as a filter to a plurality of UEs data in order to parse the data, these factors may include geolocation, duration in the location, an error associated with the geolocation determination, and a geohashing function applied to the data to generate a geochunk. The error may be used to expand or contract the number of UEs associated with a cluster in that it may be used to expand the area (radius from a geolocation) that is being included (encompassed) in the cluster.

In an alternate embodiment, an application captures information around the frequency, length of time, and time of day/day of the week of a UE's location, and a cluster may be formed for a particular UE based upon a frequency of events. For example, the application may look at the frequency of events initiated by a UE in a particular cluster, a min/max number may be set by a system administrator so that, if a user visits a restaurant once a month, so repeated visits may generate a cluster associated with the location of the restaurant and the user's UE may be associated with the cluster. However, if the same user goes to a drive-in movie theater a couple of times a year, this may not cause a cluster associated with the location of that theater to be formed, nor may it cause a UE to be added to an existing cluster for the theater's location.

In one example, if the predetermined error for location C is X miles, the error may be multiplied or reduced depending upon the size of the cluster. If there is a 100 yard radius used as the error, this means that the 100 yard radius may be applied to each UE detected within a cluster that is first determined by at least a geolocation, and any other UEs detected within the 100 yard radius may also be included in the cluster. In some embodiments, the duration during which those detected UEs are in the error radius may be taken into account, and may be determined based on a timestamp associated with a UE location. In areas where there are fewer cell towers, the error used may be larger so that the cluster sizes are larger, and in areas where there are many towers, the error used may be smaller in order to limit the cluster size. The error may also be used to form sub-clusters. Error may be defined at a regional level, and these regions may be used to define error based on tower density, subscriber density, and other factors, including subscriber density by day of week, time of year, and/or time of day. There may be different errors associated with different times of day, week, or even year, since different geographic areas, especially mountains and beaches outside of urban locations, may experience different tower loads during different seasons, as well as different maintenance challenges (e.g., hurricane and blizzard seasons). The error may be recalculated for some or all regions on a periodic basis.

Data may also be collapsed by application of a factor such as by the use of a geohash function to form a geochunk. Geochunking may be thought of as a tool to conserve processing power and more efficiently cluster UEs. If a map is thought of as a grid, geochunking reduces the problem space, that is, geochunking means that not every data point generated and transmitted by UEs is reviewed, but that the window may be collapsed when it is unlikely for a cluster to grow in a particular manner. For example, if a UE owner is in two different geolocations in a month outside of their work/live locations, the geography may be refined, and it may be assumed that points outside of the work/live location may be outliers. A geohashing algorithm may be used to refine the space associated with the geolocation applied to create the clusters. For example, a first area of a 200 miles radius may be reduced to a 50 mile radius of a tower or other location, and a UE's association with clusters that comprise a statistically insignificant number of data points outside of that 50-mile radius may not prevent that UE from being associated with one or more clusters inside of the 50-mile radius. In an embodiment, data may be collapsed by geohashing to form geochunks, so that all of the points from a UE may not be employed to determine clusters for that UE. Rather, the area is truncated based on geohashing so that extraneous points, e.g., points that may fall outside of a primary geolocation or geolocations of a UE, may be eliminated because the points are too far away to be considered part of a particular cluster. Using geohashing may reduce the processing power and time employed in evaluating data sent from UEs.

In some embodiments, geo-hashing or geo-chunking may be used to form, search, and refine the clusters and sub-clusters. Geohashing may be distinguished from clustering (e.g., the formation of clusters as discussed herein) because the geohashing algorithms are used to refine a geographic space or region into smaller chunks based on a hash function or functions. Geohashing may be performed by using algorithms to take a longitude and latitude and hash the coordinates into a string. A string of X characters would represent a smaller geographic region (geochunk) than the same string with X-1 characters. In one example, a grid may be superimposed on a geographic region, and a 12-character string may represent a 50×50 meter area, and the same string with the last 6 characters truncated may represent a 500×500 meter area on the same grid. When geohashing is used alone or along with other factors to form clusters, the geohashing may change based on the time of day, year, or day of the week.

For example, there may be a different concentration/configuration of UEs associated with a 12-character string in Manhattan during the week than on weekends, and there may be a different concentration/configuration of UEs associated with a 6-character string in the Poconos during ski season as opposed to other times of year. Strings may comprise numbers, letters, characters, or combinations thereof. Therefore, a first UE or group of UEs associated with a string of 8819611654 may also be associated with the string when it is truncated to 88169116 and a second UE associated with a string of 8819611637 may also be associated if the string is truncated to 88169116, that is, the number of UEs associated with a region (geochunk) associated with a string generated by a geohash may increase as the length of the string decreases, as a shorter string is associated with a larger area, and UEs originally associated with the longer string may still be included in the geochunk associated with a shorter, truncated string, and may be associated with UEs that would not have been included in the cluster if the longer strings were used. In an embodiment, geolocations that are located within a predetermined proximity may have similar geohash strings.

These factors may be applied in varying order and at varying degrees (e.g., range of error, geohash length), and may be re-applied to further parse the data to refine clusters (for example, if a cluster is above or below a min/max cluster size). An "attribute" is a commonality shared by a predetermined percentage of UEs in a cluster or sub-cluster. The attributes may comprise ranges in a direction or directions from a location, and/or a radius from a location, time spent in various radiuses from a location (e.g., the location used as a factor to form the cluster), average or range of distances traveled between similar locations during similar times (live/work in similar areas), time spent outside a geographic location or locations (work/recreational travel), gender, age, length of subscription service, number of UEs associated with a user account, and other attributes, some of which may be associated with business and personal user accounts for service with the telecommunications service provider. The attributes may be determined by an application based on the pluralities of data sent from the UE, as well as based on profiles associated with the UE. In some embodiments, attributes may also be associated with UE performance, such as dropped calls, calls to customer care, failed attempts to connect to towers, etc. As such, clusters and sub-clusters are formed based on factors, and then may be analyzed to determine attributes of the cluster membership associated with the UE(s) that are associated with the clusters or sub-clusters.

These attributes may then be used by the telecommunications service provider or content providers to improve service, maintenance, service offerings, and/or marketing content and offers as well as promotions. This usage may be dynamic, that is, there may be particular attributes associated with content, and if a predetermined number of UEs in a cluster or clusters are associated with these attributes, the content may automatically push to those UEs that meet the criteria of the attributes. The systems and methods discussed herein may not only enable the more efficient processing of large amounts (terabytes) of data, at least by reducing or eliminating reprocessing of data in favor of forming and re-forming/updating clusters, but also enables an improved service experience for the customer and an additional revenue stream for the telecommunications service providers in light of third party interest in pushing targeted content to UEs using attributes of cluster members. Thus, the telecommunications service provider can extract information from the clusters (e.g., find target UEs based on attributes of cluster members) and analyze the clusters, as opposed to continuously reprocessing the data received from the UE to obtain information, which takes considerable time and expense. The cluster attribute data may be analyzed, tracked, trended, and stored and used for further comparison to detect population shift, this information may also be useful to the telecommunications service provider in their maintenance and tower location determinations.

In an embodiment, the location of a UE may be determined by trilateration, and error is inherent in trilateration of UE location. The error associated with trilateration may vary based on the concentration of towers, the time of day, the time of week, and/or other factors. For example, if a UE is in a rural area where there are few towers, so there may be a larger error in the trilateration calculation than there would be in a densely populated area that has more towers. In an embodiment, the error may be used in cluster determination in order to allow a cluster size to tighten or grow, and the error may be applied at a regional level, since towers are divided up into regions across multiple geographic areas. In an embodiment, if a cluster is formed using the systems and methods discussed herein, the system may check to determine if the cluster comprises a minimum number of UEs, or that it does not exceed a maximum number of UEs, and the analysis may be redone or an additional factor may be applied to the analysis in order to reform the cluster or clusters.

A region, as discussed herein, may be defined by a geographic tower location or locations, and an error is associated with each region. There may be a first error associated with region K during weekdays from 8 AM-6 PM, and a second error associated with the same region on weekends or weekdays after 6 PM. Region sizes may differ based on tower concentration, if the map of the United States is covered in a grid, and clusters may, in some embodiments, be determined (defined) by the error associated with a region during a particular date, time, day of the week, season, etc.

In an embodiment, once clusters are formed, the clusters can be analyzed to determine patterns and enable an application to perform pattern matching. In an embodiment, an application may, on a dynamic, periodic basis, analyze what clusters a UE is associated with and look at how the UE traverses (travels between) the two or more clusters or sub-clusters during certain times of day/week/year/etc. That is, the clusters may be used to determine patterns of movement during various times of day, week, year, etc., and to identify travel patterns and travel distances between work and home, between home and vacation locations, as well as to identify work travel patterns, which may be linear or closed loop (e.g., relocation may also be tracked using the clusters).

The systems discussed herein may use the clusters generated over the course of a predetermined time period to determine these patterns, e.g., to look at trip frequency, and, in some cases, generate a closed travel path for a particular cluster, representing a group that may work, travel, vacation, etc., to determine a "normal" course of location and activity (e.g., a weekday commute or recurring travel to the same or similar locations) as well as side trips and anomalies. In an embodiment, a pattern of travel may be a hexagon or other polygon, e.g., a closed loop, but may also include offshoots that may represent errands, weekend trips, or other travel that may not be part of a pattern of travel that may typically include work, school, gym, and other location visits that would form a primary loop.

Given the history of a UE's location events that may be associated with a time range, a date range, or a day of the week, a min or max number of clusters they are associated with may be predefined. That is, for a cluster to be generated, there is to be a set of points close to each other in both time and space. In an embodiment, an application may look at individual users and/or a specific UE's data and associate that device with a cluster or clusters. If multiple UEs are in a location, this may represent aspects of the location such as a location near sporting forums or resorts. Clusters may be defined by location, by time of activity, and by other factors, and the clusters may be defined differently among and between UEs based on these factors.

In an embodiment, data is received by a telecommunications service provider at predetermined intervals from a plurality of UEs supported by the provider. The UEs may comprise mobile phones, tablets, e-readers, laptop computers, wearable technology, hybrid devices, or other devices configured to communicate a plurality of information to a telecommunications service provider. The information transmitted by the UEs may comprise geo-location information obtained by using information obtained from at least one enhanced node B (eNB) or base transceiver station (BTS) or other tower configured to provide service to and/or transmit data to and from the UEs. This geo-location information may be referred to as "location" information, and may be determined within a certain amount of error, this error may depend on the load on the network in the location, the number of eNBs in the area, and other factors.

When clusters are determined, it is a multi-faceted determination, where a cluster may comprise a plurality of UEs, and wherein a single UE may be assigned to and/or associated with more than one cluster, and this cluster association may be stored on the telecommunications service provider's network, e.g., in a data store, as well as in the memory of the UE. The information transmitted from the plurality of UEs may further comprise information associated with the location of a UE, for example, the day of the week, the time of day, the duration in the location, an error associated with the location. The error associated with the location determination may be due to having a high concentration of towers in a particular geographic area, so a UE may not change locations and may still be associated with different towers, or due to having a low concentration of towers over a particular geographic are. This information may be employed to generate clusters associated with traditional work-week locations, e.g., a UE may be associated with a first cluster from Monday-Friday, 8 AM-6 PM, and may be associated with a second cluster from 6 PM-8 AM from Monday-Friday, and then with a third cluster on the weekends and/or holidays. A UE may be disassociated from a cluster or clusters, and additional UEs may be added to clusters based on dynamic, ongoing analysis that associates UEs to clusters and further analyzes the clusters to determine attributes and develop profiles for each cluster and sub-cluster.

Figure 1:
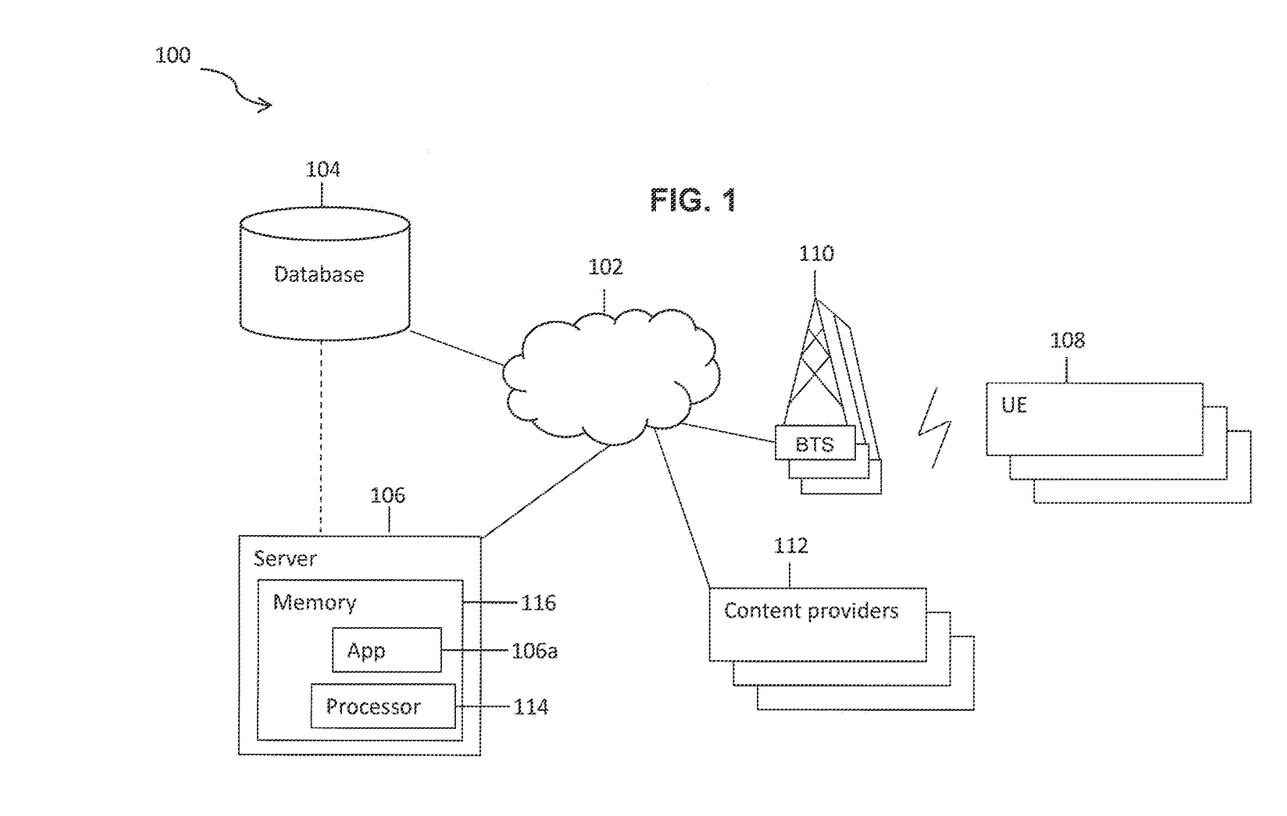
FIG. 1 is a block diagram of a communication system according to an embodiment of the disclosure.

FIG. 1 is a schematic illustration of a communication system 100. The system 100 comprises a plurality of eNBs 110 that may be referred to as towers, the plurality of towers 110 are in communication with a plurality of user equipments (UEs) 108 associated with a telecommunications service provider across a plurality of brands. The plurality of UEs 108 transmit information via a network 102 to the telecommunications service provider that may be stored in a database or data store 104. The data store 104 is in communication with a server 106 comprising a non-transitory memory 116 where an application 106a is stored and executed by a processor 114. The telecommunications service provider may desire to analyze the data sent by the plurality of UEs 108, and a plurality of content providers 112 may desire to send marketing, advertising, and promotional materials to some of the plurality of UEs 108.

The data received by the database 104 is analyzed by the application 106a to form clusters based on factors applied to the plurality of data, and the attributes of the clusters or sub-clusters formed may be determined by the application 106a. The identified attributes may be employed by the content providers 112 and the telecommunications service provider to provide better service, maintenance, service options, and third party services/offers. In various embodiments, the content providers 112 may send requests to the application 106a or to another application on a separate server of the telecommunications service provider in order to obtain information to use to push content and offers to the UEs 108.

In an embodiment, the data store 104 may also be employed to store links (associations) between (1) individual UEs and clusters/sub-clusters, (2) individuals UEs and user accounts, (3) user accounts and clusters/sub-clusters. The plurality of UEs is dynamically updated when users form, modify (brand changes, account changes, service plan changes within the same brand, etc.), and terminate relationships with the telecommunications service provider. Data is continuously received by the database 104 from the plurality of UEs 108, and new UEs are added to the plurality of UEs 108 and some are removed from the plurality of UEs 108 if they are associated with other telecommunications service providers or taken offline completely (retired). As such, the clusters and sub-clusters may be revised on a periodic basis by adding or removing UEs 108 to the clusters based on the newly received data, and, in some embodiments, new clusters and sub-clusters may be formed, for example, if new towers 110 are established or old towers are retired or relocated, or as new data is received from the plurality of UEs 108. The content providers 112 may ultimately push content to some of the plurality of UEs 108 by way of the network 102 and the plurality of towers 110. The clusters formed using the system 100 may be further analyzed by the application 106a to determine a plurality of attributes associated with each cluster, and a profile for each cluster and/or sub-cluster may be stored in, for example, the data store 104 or on a remote server location. The application 106a or another appropriately configured application may subsequently receive requests for clusters that have certain attributes. In some embodiments, the application 106a may also be configured to receive and store profiles from third parties or from the telecommunications service provider itself that enable the automated delivery of content to at least one cluster or sub-cluster based upon the profile (and attributes that comprise the profile) associated with the cluster. This is discussed in further with reference now to FIG. 2.

Figure 2:
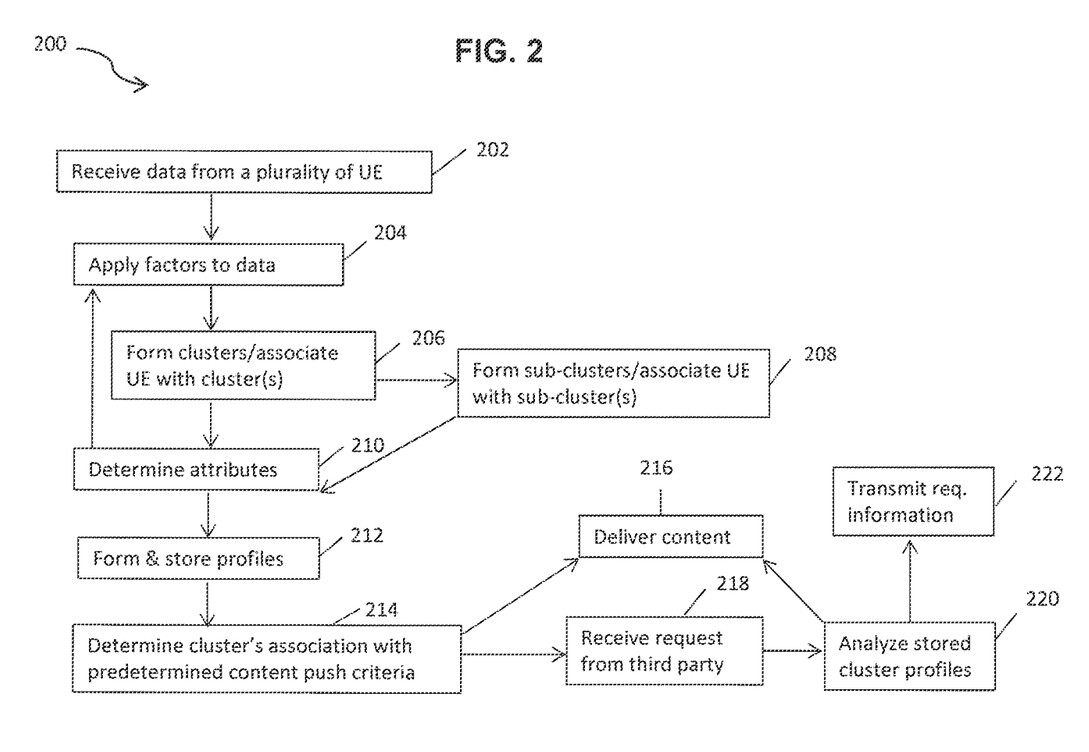
FIG. 2 is a flow chart of a method according to an embodiment of the disclosure.

FIG. 2 is a flow chart of a method 200 of clustering telecommunications service provider subscribers and employing the clusters to provide improved service. In the method 200, at block 202, an application stored in a non-transitory memory of a server parses data received from a plurality of UEs. In an embodiment, the plurality of UEs are associated with a telecommunications service provider across a plurality of brands (national and international) supported by the provider. The plurality of UEs may transmit, at periodic intervals or on a continuous basis, a plurality of information associated with the UEs such as a geo-location, usage data, timestamp associated with a location or duration in a location (day of the week, month, date, time), and other data, some of which may be obtained within a predetermined error as discussed herein that may be based on a region and/or a time of day, week, month, year, or combinations thereof.

In an embodiment, at block 204, a plurality of factors is applied to the data received at block 202 in order to form a plurality of clusters at block 206. A cluster may be the term used to describe a plurality of UEs associated with data commonalities as determined by the factors applied. The factors applied at block 204 may comprise at least two of a location, a timestamp, an error, and a geo-hash function used to generate a geochunk (refinement of area location). Depending upon the embodiment, the factors applied, which may also be referred to as factors or filters, may be applied in various orders and combinations, and may be employed more than once in the application of factors at block 204. For example, a location factor may be applied, then a timestamp (duration in location) factor, and then an error factor, based on a determination that the previously applied factors established a cluster size above a predetermined threshold. At block 206, a plurality of clusters are formed based on the factors applied at block 204. The formation of clusters at block 206 comprises associating at least some of the plurality of UEs from which data is received at block 202 with a cluster, which may be defined by any form of known identifier. The application stores the associations (links) between clusters and UEs in a data store along with attributes that define the characteristics of the cluster. Therefore, clusters are first determined by factors at block 204, and then the attributes of the clusters may be determined. In some embodiments, further analysis, re-clustering, or sub-clustering may be performed. This further analysis may be based on cluster size as originally determined at block 206, or based on other factors such as new tower locations or other changes that may impact the clustering process and later use of the clusters.

In one example, it may be determined that clusters formed at block 206 may be associated with UEs that have additional attributes in common, for example, ranges of and radiuses from a location, average or range of distances traveled between similar locations during similar times (live/work in similar areas), time spent outside a geographic location or locations (work/recreational travel), gender, age, length of subscription service, number of UEs associated with a user account, and other attributes, some of which may be associated with business and personal user accounts for service with the telecommunications service provider. That is, membership in a cluster may mean that a UE has attributes sought by the telecommunications service provider or third parties, and in some cases, cluster attributes may indicate that the cluster was erroneously formed or is to be reformed or made into sub-clusters. Clusters may be thought of as associations or links between UEs based upon the factors applied, the clusters may be stored as a list of UEs associated with a single cluster, and/or the profiles for individual UEs may comprise a link or an association with one or more clusters. A UE may be a member of more than one cluster, and a cluster's membership may be employed to form sub-clusters, generate profiles, and other functions as discussed herein.

At block 210, a plurality of attributes including a number of UEs and/or UE accounts associated with the clusters formed at block 206 may be determined. If the application determines that a cluster is too large, too small, or is associated with another attribute that may make it desirable to reform or further parse the cluster into sub-clusters, the method moves back to block 204 and additional factors or some or all of the same factors applied previously at block 204 may be applied but at different levels (e.g., a different time or a different error). The method moves back to blocks 206 and 210, and when, at block 210 the attributes of the clusters or sub-clusters (which may have been formed at block 208).

In an embodiment, the formation of clusters at block 206 may comprise storing an association in a data store between a UE and/or an account comprising multiple UEs and at least one cluster that the UE is identified as being a part of. The associations between the sub-clusters and the UEs that comprise the sub-clusters may be stored in the data store such that a single UE may be associated with one or more clusters and one or more sub-clusters associated with the one or more cluster. The formation of clusters at blocks 206 and 208 enables processing and analysis of data by cluster, e.g., attributes and commonalities among and between clusters may be used to determine advertising targets, pricing, service type offerings, brand offerings (within the telecommunications service provider's network), service level, areas for maintenance improvement, as well as other information that may have previously been determined by re-analyzing the information received at block 202. By using the clusters and sub-clusters for analysis based upon which actions may be taken, less processing power is employed than that used to re-process the data received at block 202. As new data is received from UEs, and as new UEs are added to the telecommunications service provider, additional data may be received at block 202, and the new UEs may be associated with clusters and sub-clusters, and existing UEs may be associated with additional or different clusters and/or sub-clusters and disassociated (unlinked) from others, e.g., if a user moves from Chicago to Detroit, they may be disassociated from a Chicago-centric cluster or clusters, or associated with a cluster related to business travelers to Chicago and not with residents.

At block 212, based upon the attributes of the clusters and sub-clusters determined at 210, a plurality of profiles are formed and stored. Each profile of the plurality of profiles formed and stored at block 212 may comprise various attributes such as a directional range or a radius from at least one location, an average distance traveled during a predetermined time period, a range of distance traveled during a predetermined time period, common destinations during a predetermined time period, a duration of time spent outside a geographic location, a gender, an age, a length of subscription service, or a number of UEs associated with a user account. A "directional range" may be the term used to describe a distance from a geographic location that extends over a particular region but not around a 360 degree circumference as a radius from a location would be. For example, a directional range may be 75 miles from Chicago extending north and west, in contrast to a 75 mile radius from Chicago, which would extend north, south, east, west, as well as directions in between.

In an embodiment, at block 214, the telecommunications service provider and/or content providers (third parties) may have a plurality of cluster attributes stored as a content delivery profile, which may be stored in the same or in a different location (server) as the profiles formed and stored at block 212. In this example, any clusters or sub-clusters that have the attributes of the content delivery profile may have content automatically delivered on a dynamic and/or periodic basis at block 216 to the UEs associated with the cluster or sub-clusters that meet a minimum number of attributes of the content delivery profile. It is appreciated that UEs associated with multiple clusters or sub-clusters that meet the minimum number of attributes associated with the content delivery profile may not receive duplicate information. The content delivered could be maintenance surveys, upgrades to existing software/firmware/etc., or may be content related to marketing/advertising/rewards programs associated with content providers.

In an embodiment, the telecommunications service provider may analyze the profiles formed and stored at block 212 to determine when it is desirable to offer various secondary comment, service type offerings, brand offerings (within the telecommunications service provider's network), and/or to analyze a service level associated with a cluster or clusters, which may indicate areas or types of UEs that may be targets improved maintenance or service offerings, as well as which towers may have performance concerns.

At block 218, the application may receive a request from a third party content provider for UEs and/or accounts associated with UEs that meet particular attributes, in some cases, in a particular area of the country. The request may comprise a request for information, or a request to push content from the third party to users of UEs that meet the attributes. At block 220, in response to receiving the request at block 218, the application analyzes at least some of the profiles formed and stored at block 212 to determine what clusters meet the requested information. At block 222, the application may transmit the requested information to the content provider, and in some embodiments, the telecommunications service provider may receive content from the content provider in the request at block 218 and may deliver content at block 216 subsequent to the analysis at block 220.

Figure 3:
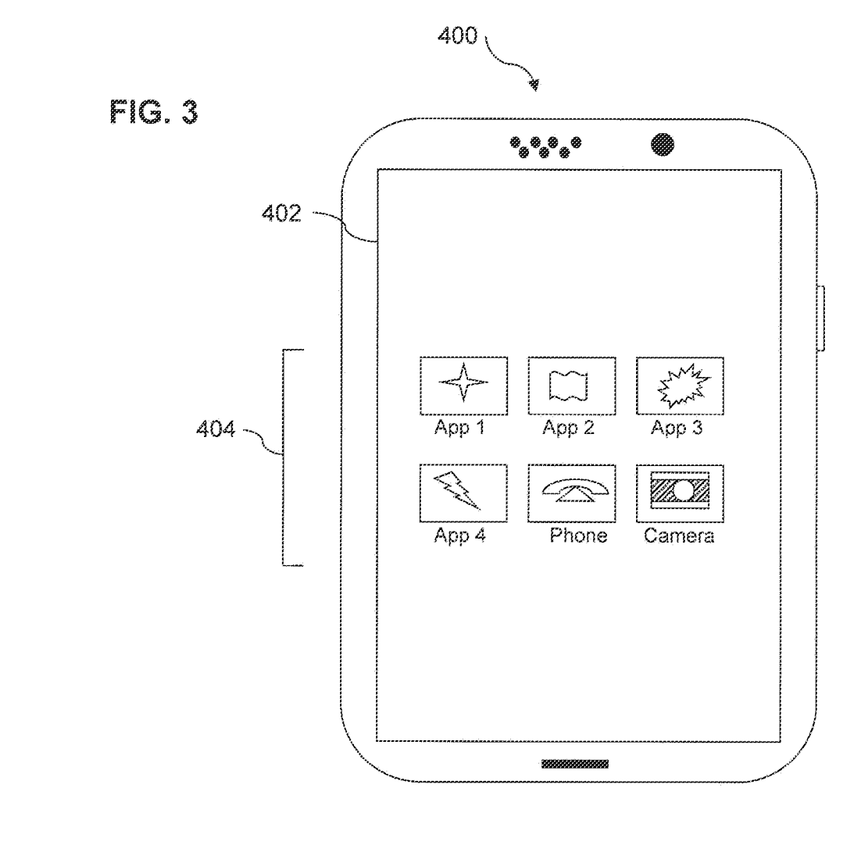
FIG. 3 is an illustration of a handset according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
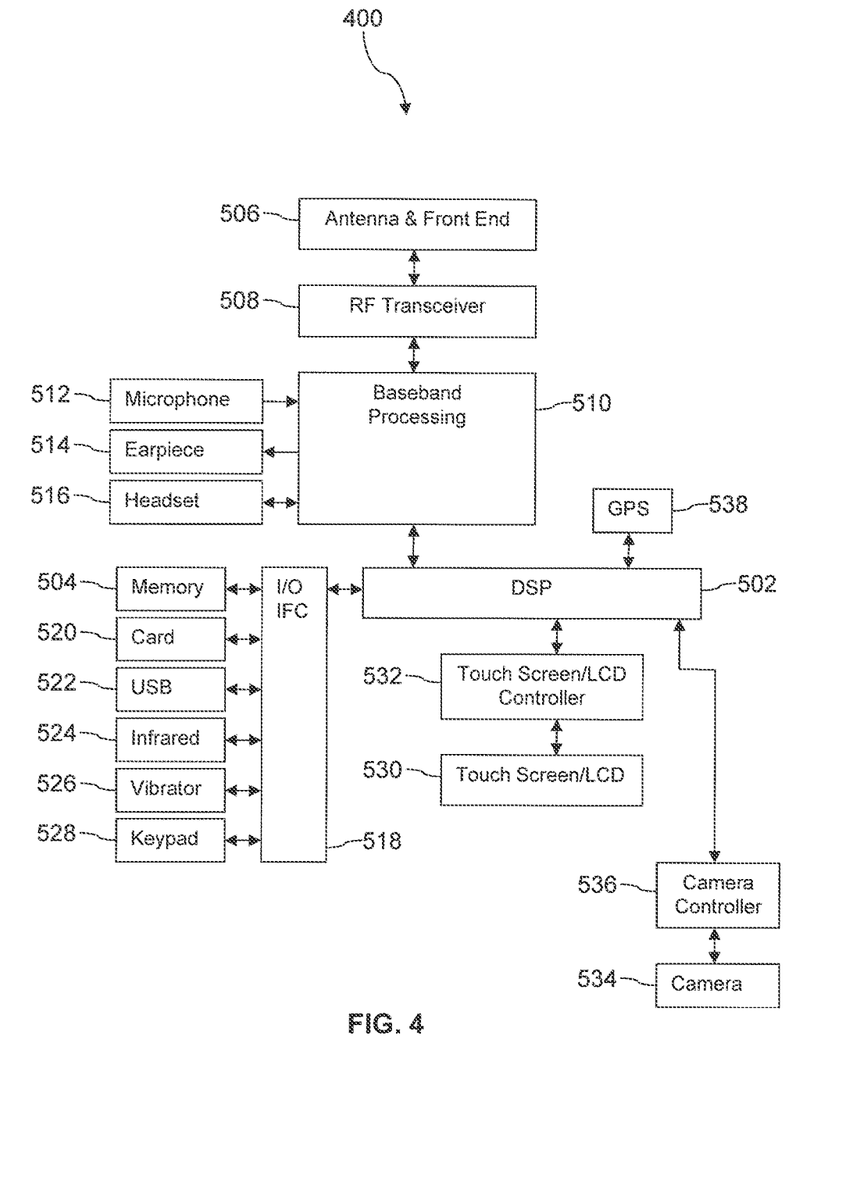
FIG. 4 is a block diagram of a configuration of hardware architecture of a handset according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
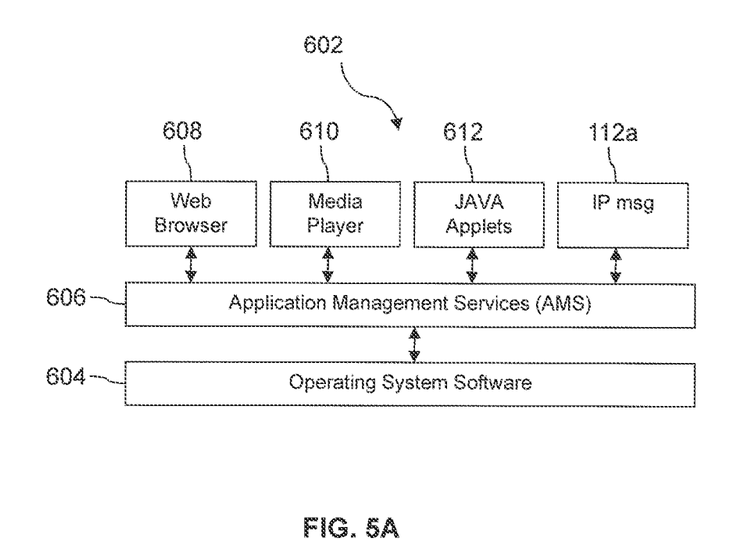
FIG. 5A is a block diagram of a software architecture of a handset according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610 and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 5B:
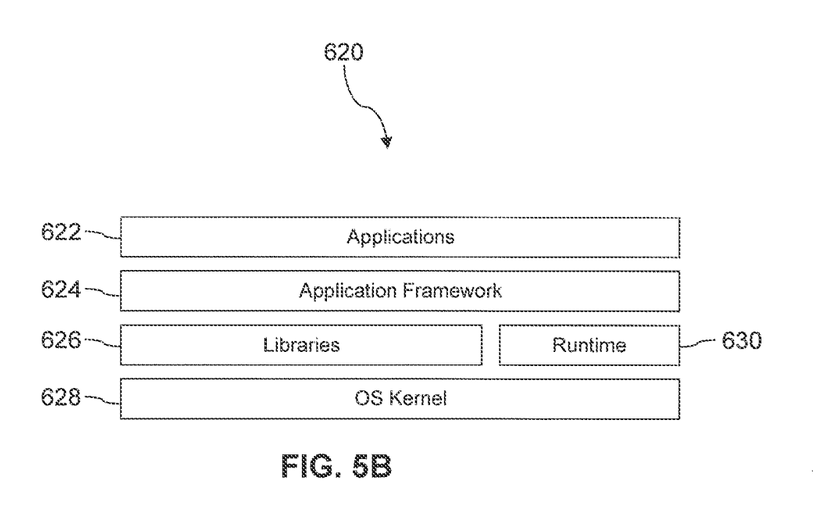
FIG. 5B is a block diagram of another software architecture of a handset according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
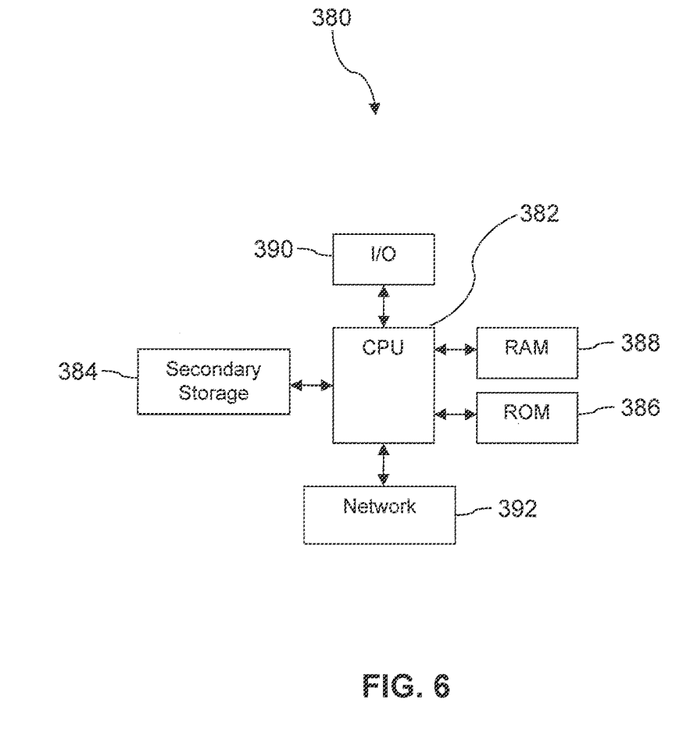
FIG. 6 is a block diagram of a computer system according to an embodiment of the disclosure

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for determining clusters of telecommunications service provider subscribers, comprising:
    a plurality of enhanced node B (eNB) stations;
    a server associated with a content provider;
    a server comprising an application stored in a non-transitory memory and executable by a processor;
    a data store in communication with the server and configured to receive pluralities of data at periodic intervals from a plurality of user equipments (UEs), wherein each UE of the plurality of UEs is in communication with at least one enhanced node B of the plurality of eNBs and the pluralities of data are associated with the plurality of UEs performance and activity;
    wherein the application, when executed by the processor:
        analyzes a first plurality of data from the data store based upon a UE location and a timestamp, wherein the timestamp is associated with a duration of time in the UE location;
        forms, in response to the analysis, a plurality of clusters, wherein a first portion of the UEs of the plurality of UEs are members of a first formed cluster based on a determination that the first portion was associated with a first UE location and a first duration of time in the first UE location, wherein a second portion of UEs of the plurality of UEs are members of a second formed cluster based on a determination that the second portion of UEs of the plurality of UEs was associated with a second UE location for a second duration of time in the second UE location, wherein the first cluster further includes a third portion of UEs of the plurality of UEs when the third portion of UEs are determined to be outside of a first distance radius with respect to the first location, within a second distance radius with respect to the first location, and present outside of the first distance but within the second distance radius for a specified period of time with respect to a time threshold, and wherein the second distance radius is at least partially determined according to an error distance associated with determining the first location;
        determines, subsequent to the parsing, a plurality of attributes of the members of the first formed cluster;
        generates and stores a profile for the first formed cluster in the data store based on the determined plurality of attributes;
        receives a request from the content provider server to transmit content to UEs of the plurality of UEs associated with a set of attributes;
        analyzes, in response to receiving the request, at least some of the plurality of clusters based on a profile associated with each cluster;
        determines a subset of clusters of the plurality of clusters associated with the set of attributes in the request; and
        transmits the content to the UEs associated with the subset of clusters.

2. The system of claim 1, wherein the plurality of UEs is associated with a telecommunications service provider and is dynamically updated, wherein at least some of the UEs associated with the first cluster are also associated with the second formed cluster.

3. The system of claim 1, wherein an attribute of each cluster of the plurality of clusters is a number of UEs in the cluster, wherein the application determines if a number of members of first formed cluster is outside of a predetermined range.

4. The system of claim 3, wherein the application, in response to a determination that the first formed cluster is associated with a number of UEs above the predetermined range, parses the first formed cluster to form a plurality of sub-clusters.

5. The system of claim 1, wherein the first duration of time and the second duration of time comprise at least one of a range of minutes, a range of hours, and at least one day of the week.

6. The system of claim 1, wherein the plurality of attributes comprises: a directional range or a radius from at least one location, an average distance traveled during a predetermined time period, a range of distance traveled during a predetermined time period, common destinations during a predetermined time period, a duration of time spent outside a geographic location, a gender, an age, a length of subscription service, or a number of UEs associated with a user account.

7. The system of claim 1, wherein the application stores, on the server, a plurality of links between the first portion of the UEs and the first formed cluster, and a plurality of links between the second portion of the UEs and the second formed cluster.

8. A system for determining clusters of telecommunications service provider subscribers, comprising:
    a server comprising an application stored in a non-transitory memory and executable by a processor;
    a data store in communication with the server and configured to receive data at periodic intervals from a plurality of user equipments (UEs), wherein each UE of the plurality of UEs is in communication with at least one enhanced node B (eNB) of a plurality of base transceiver stations, wherein the data is associated with at least a UE location, a predetermined error associated with the UE location, and a duration of time associated with a UE's presence in the location;
    wherein the application, when executed by the processor:
        analyzes a first plurality of data from the data store based upon a UE location associated with the first plurality of data, a duration of time associated with the UE location, and a predetermined error associated with the UE location;
        forms, in response to the analysis of the first plurality of data, a first plurality of clusters, wherein some of the UEs are members of a first cluster of the first plurality of clusters formed based on the at least some UEs association with a first location for a first duration of time and a first predetermined error associated with the first location, wherein some UEs of the plurality of UEs are members of a second cluster of the first plurality of clusters formed based on the at least some UEs association with a second location for a second duration of time and a second error associated with the second location, wherein the first cluster further includes some other UEs of the plurality of UEs when the other UEs are determined to be outside of a first distance radius with respect to the first location, within a second distance radius with respect to the first location, and present outside of the first distance radius but within the second distance radius for a specified period of time with respect to a time threshold, and wherein the second distance radius is at least partially determined according to the first predetermined error associated with the first location.

9. The system of claim 8, wherein the first plurality of data is received during a first period of time.

10. The system of claim 9, wherein the application:
    analyzes a second plurality of data, wherein the second plurality of data is received during a second period of time, and
    forms, in response to the analysis of the second plurality of data, a second plurality of clusters based upon a UE location associated with the second plurality of data, a duration of time associated with the UE location, and a predetermined error associated with the UE location.

11. The system of claim 10, wherein the application updates, in response to the analysis, at least some of the plurality of clusters, by at least one of storing or removing at least one UE's association with the first cluster of the second plurality of clusters.

12. The system of claim 10, where the second plurality of data is associated with at least some UEs that were not part of the plurality of UEs comprising the first plurality of clusters.

13. The system of claim 10, wherein the second period of time does not overlap with the first period of time.

14. The system of claim 10, wherein a portion of the second period of time less than an entire duration of the second period of time overlaps with the first period of time.

15. The system of claim 9, wherein the plurality of UEs comprise tablets, personal digital assistants (PDA), phones, laptop computers, and wearable technology.

16. The system of claim 9, wherein the first cluster and the second cluster comprise at least some of the same UEs of the plurality of UEs.

17. A method for determining clusters of telecommunications service provider subscribers, comprising:
    performing, by an application stored in a non-transitory memory of a server, a first analysis on a plurality of data, based upon at least two of a determined first UE location, a duration in the first UE location, a second UE location, a duration in the second UE location, an error associated with the determination of the first UE location, an error associated with a second UE location, and a first geohash function, wherein the first geohash function generates a first string, wherein the plurality of data is associated with a plurality of user equipments (UEs);
    forming, by the application, based on the analysis, a first plurality of clusters, wherein each UE of the plurality of UEs are members of at least one cluster of the first plurality of clusters, wherein a cluster of the first plurality of clusters includes some UEs of the plurality of UEs when the some UEs are determined to be outside of a first distance radius with respect to the first UE location, within a second distance radius with respect to the first UE location, and present outside of the first distance radius but within the second distance radius for a specified period of time with respect to a time threshold, and wherein the second distance radius is at least partially determined according to the error associated with the determination of the first UE location;
    performing, by the application, a second analysis at least some of the plurality of data by applying at least one of a different error associated with the first UE location, a different error associated with the second UE location, and a second geohash function, in response to a determination that at least some of the first plurality of clusters are associated with a number of UEs below a predetermined threshold;

forming, by the application, based on the second analysis, a second plurality of clusters, wherein each cluster of the second plurality of clusters is associated with a number of member UEs above the predetermined threshold.

18. The system of claim 17, wherein the second plurality of clusters is formed by applying the different error associated with the first UE location or the different error associated with the second UE location.

19. The system of claim 17, wherein the second geohash function generates a shorter string length than a length of the first string generated by the first geohash function.

20. The system of claim 17, further comprising storing, by the application, in the non-transitory memory of the server, a link between each cluster of the second plurality of clusters and each UE associated with that cluster.

* * * * *